United States Patent
Takahashi

(10) Patent No.: US 8,703,043 B2
(45) Date of Patent: Apr. 22, 2014

(54) NON-FERROUS METAL MELT PUMP AND NON-FERROUS METAL MELTING FURNACE USING THE SAME

(75) Inventor: Kenzo Takahashi, Matsudo (JP)

(73) Assignee: Zmag, Ltd., Matsudo-shi (JP)

( * ) Notice: Subject to any disclaimer, the term of this patent is extended or adjusted under 35 U.S.C. 154(b) by 0 days.

(21) Appl. No.: 13/343,327

(22) Filed: Jan. 4, 2012

(65) Prior Publication Data
US 2012/0104669 A1    May 3, 2012

Related U.S. Application Data

(62) Division of application No. 12/644,637, filed on Dec. 22, 2009.

(30) Foreign Application Priority Data

Dec. 26, 2008   (JP) .................................. 2008-334089
May 29, 2009   (JP) .................................. 2009-131249

(51) Int. Cl.
    *B22D 41/00*       (2006.01)
    *F27D 3/14*        (2006.01)

(52) U.S. Cl.
    USPC ............................ 266/200; 266/234; 222/594

(58) Field of Classification Search
    USPC .......... 266/200, 234, 237, 239; 222/594, 590; 417/50, 53; 164/337, 312
    See application file for complete search history.

(56) References Cited

U.S. PATENT DOCUMENTS

| | | | |
|---|---|---|---|
| 2,730,951 A * | 1/1956 | Donelian et al. ................ | 417/50 |
| 7,316,800 B1 | 1/2008 | Dardik et al. | |
| 2004/0234379 A1 * | 11/2004 | Miner et al. .................... | 417/50 |
| 2006/0133194 A1 | 6/2006 | Takahashi | |
| 2007/0140868 A1 | 6/2007 | Peel et al. | |

FOREIGN PATENT DOCUMENTS

| EP | 0 446 075 A2 | 9/1991 |
|---|---|---|
| EP | 0 446 075 A3 | 9/1991 |
| EP | 1 674 814 A2 | 6/2006 |
| EP | 1 674 814 A3 | 6/2006 |

(Continued)

OTHER PUBLICATIONS

Notice of Allowance issued Aug. 22, 2012 in Korean Patent Application No. 10-2009-0129278 (with English-language translation).

(Continued)

*Primary Examiner* — Scott Kastler
*Assistant Examiner* — Michael Aboagye
(74) *Attorney, Agent, or Firm* — Oblon, Spivak, McClelland, Maier & Neustadt, L.L.P.

(57) ABSTRACT

A non-ferrous metal melting furnace includes a non-ferrous metal melt pump, a vortex chamber body, and a magnetic field device formed of permanent magnets. The vortex chamber body makes a non-ferrous metal melt flow into a vortex chamber from an inlet, makes the non-ferrous metal melt flow in a spiral shape by applying a driving force to the non-ferrous metal melt in the vortex chamber, and discharges the non-ferrous metal melt from the vortex chamber to an outlet. The magnetic field device formed of permanent magnets is disposed outside the vortex chamber and below a bottom plate of the vortex chamber, and applies the driving force that is generated by current flowing in the non-ferrous metal melt and magnetic lines of force from the magnetic field device formed of permanent magnets.

7 Claims, 7 Drawing Sheets

(56) References Cited

FOREIGN PATENT DOCUMENTS

| JP | 6-284685 A | 10/1994 | | |
|---|---|---|---|---|
| JP | 7-301490 A | 11/1995 | | |
| JP | 07301490 | * 11/1995 | ................ | F27B 3/04 |
| JP | 10-146650 A | 6/1998 | | |
| JP | 2006-341281 A | 12/2006 | | |
| JP | 2008-196807 A | 8/2008 | | |
| SU | 425730 A1 | 4/1974 | | |
| WO | WO 2004/102096 A1 | 11/2004 | | |
| WO | WO 2008/010285 A1 | 1/2008 | | |

OTHER PUBLICATIONS

Partial European Search Report issued Apr. 16, 2010 in European Patent Application No. 09180642.2.
Extended European Search Report issued Jul. 27, 2010 in European Patent Application No. 09180642.2.
Office Action issued May 24, 2011 in Japanese Patent Application No. 2009-131249 (with English-language translation).
Extended European Search Report issued Aug. 29, 2011 in European Patent Application No. 11156821.8.

* cited by examiner

NON-FERROUS METAL MELT PUMP AND NON-FERROUS METAL MELTING FURNACE USING THE SAME

CROSS REFERENCE TO RELATED APPLICATIONS

This application is a divisional of U.S. patent application Ser. No. 12/644,637, filed Dec. 22, 2009, and is based upon and claims the benefit of priority from prior Japanese Patent Applications No. 2008-334089, filed on Dec. 26, 2008 and No. 2009-131249, filed on May 29, 2009, the entire contents of which are incorporated herein by reference.

BACKGROUND OF THE INVENTION

1. Field of the Invention

The present invention relates to a non-ferrous metal melt pump and a non-ferrous metal melting furnace using the non-ferrous metal melt pump, and more particularly, to a so-called non-ferrous metal melt pump without an impeller and a non-ferrous metal melting furnace using the non-ferrous metal melt pump.

2. Background Art

Conventionally, a non-ferrous metal melt has been fed by a non-ferrous metal melt pump. As the non-ferrous metal melt pump, there have been a pump that feeds a non-ferrous metal melt by rotating an impeller directly submerged in a non-ferrous metal melt so as to apply kinetic energy to the melt, and a pump that uses eddy current generated in a melt by applying a movable magnetic field to a melt from the outside of a melt flow channel.

The former has had problems in that the damage of the impeller rapidly increases running costs and it is difficult to manage the operation.

Meanwhile, the latter has had various substantive problems in that the size of an apparatus, large running costs are required due to the high price of an apparatus, and maintenance becomes complicated.

Further, in terms of the combination with a melting furnace, the former is unique. However, since the problems of the former are not solved at present, many engineers have made efforts day and night in order to combine the pump with the melting furnace.

SUMMARY OF THE INVENTION

There has been a problem in that a non-ferrous metal melt pump suitable for the combination with a melting furnace may not be obtained at present.

The invention has been made in consideration of the above-mentioned circumstances, and an object of the invention is to provide a non-ferrous metal melt pump suitable for the combination with a melting furnace and a non-ferrous metal melting furnace using the non-ferrous metal melt pump.

According to an aspect of the invention, there is provided a non-ferrous metal melt pump that includes a vortex chamber body and a magnetic field device formed of permanent magnets. The vortex chamber body makes a non-ferrous metal melt flow into a vortex chamber from an inlet, makes the non-ferrous metal melt flow in a spiral shape by applying a driving force to the non-ferrous metal melt in the vortex chamber, and discharges the non-ferrous metal melt from the vortex chamber to an outlet. The magnetic field device formed of permanent magnets is disposed outside the vortex chamber and below a bottom plate of the vortex chamber, and applies the driving force to the non-ferrous metal melt by an electromagnetic force that is generated by current flowing in the non-ferrous metal melt and magnetic lines of force from the magnetic field device formed of permanent magnets. The vortex chamber body includes a spiral flow channel that is formed from the inlet to the outlet. The inlet and the bottom plate face each other in an up-and-down direction. The outlet is opened in a substantially horizontal direction. The bottom plate forms a flat surface parallel to a horizontal plane. A first electrode is disposed on an inner surface of the bottom plate. Second electrodes face the inner surface of the bottom plate in an up-and-down direction, and are disposed on an inner surface of a top plate of the vortex chamber so that current flows between the first electrode and the second electrodes. The magnetic field device formed of permanent magnets is disposed below the bottom plate of the vortex chamber of the vortex chamber body and outside the vortex chamber so as to face the bottom plate in an up-and-down direction. The flow-in direction of the non-ferrous metal melt that flows into the vortex chamber, and the direction of the magnetic lines of force that are generated by the magnetic field device formed of permanent magnets follow the up-and-down direction.

Further, according to another aspect of the invention, there is provided a non-ferrous metal melt pump that includes that the non-ferrous metal melt pump and a substantially tubular melting furnace. The tubular melting furnace includes an opening through which non-ferrous metal as a raw material is input. The non-ferrous metal melt pump is disposed so that the inlet faces the upper side, and a bottom opening of the melting furnace communicates with the inlet.

Furthermore, according to another aspect of the invention, there is provided a non-ferrous metal melt pump that includes a vortex chamber body and a movable magnetic field generator. The vortex chamber body makes a non-ferrous metal melt flow into a vortex chamber from an inlet, makes the non-ferrous metal melt flow in a spiral shape by applying a driving force to the non-ferrous metal melt in the vortex chamber, and discharges the non-ferrous metal melt from the vortex chamber to an outlet. The movable magnetic field generator is disposed outside the vortex chamber and below a bottom plate of the vortex chamber, and applies the driving force to the non-ferrous metal melt by rotating magnetic lines of force, which pass the non-ferrous metal melt in an up-and-down direction, along a horizontal plane. The inlet and the bottom plate face each other in an up-and-down direction, the outlet is opened in a substantially horizontal direction, and the vortex chamber body includes a spiral flow channel that is formed from the inlet to the outlet. The movable magnetic field generator includes a magnet base and the plurality of permanent magnets. The magnet base is formed of a rotating plate that is supported so as to rotate around an axis extending in an up-and-down direction. The plurality of permanent magnets is circumferentially disposed on the surface of the magnet base facing the bottom plate of the vortex chamber in an up-and-down direction so that different polarities are arranged alternately. The magnetic lines of force that are generated by the plurality of permanent magnets pass through the non-ferrous metal melt existing in the vortex chamber in an up-and-down direction, and the non-ferrous metal melt flows in an up-and-down direction into the vortex chamber. As the permanent magnets are rotated, the magnetic lines of force move along a horizontal plane, the magnetic lines of force passing through the non-ferrous metal melt substantially in an up-and-down direction, so that a driving force is applied to the non-ferrous metal melt.

In addition, according to another aspect of the invention, there is provided a non-ferrous metal melting furnace that includes the non-ferrous metal melt pump and a substantially tubular melting furnace. The melting furnace includes an opening through which non-ferrous metal as a raw material is input. The non-ferrous metal melt pump is disposed so that the inlet faces the upper side, and a bottom opening of the melting furnace communicates with the inlet.

According to the invention, since eddy current is not generated, it may be possible to maintain, the high efficiency of a pump without the hindrance of the movement of a non-ferrous metal melt that is caused by an electromagnetic force.

DETAILED DESCRIPTION OF THE INVENTION

A principle of operation of the invention will be briefly described before an embodiment of the invention is described.

In brief, a basic principle of operation of the invention is to move a non-ferrous metal melt by an electromagnetic force that is generated by current flowing in the non-ferrous metal melt and a magnetic field applied from the outside. The inventor has proposed a melting furnace with an agitator and an agitator for a melting furnace (Japanese Patent Application Laid-Open (JP-A) No. 2006-349293) as an invention using the principle of operation. The invention is also based on the same principle as a principle of operation that is disclosed in JP-A No. 2006-349293.

Meanwhile, according to the invention, in particular, a magnetic field direction is made to correspond to the movement direction of a non-ferrous metal melt flowing into a magnetic field region to prevent the generation of eddy current. The reason to prevent the generation of eddy current is that the movement of the non-ferrous metal melt may be hindered by an electromagnetic force and the efficiency of a pump deteriorates if eddy current is generated in the non-ferrous metal melt. The electromagnetic force, which is to be generated by eddy current, is generated when a conductor (the non-ferrous metal melt in the invention) is moved in a direction perpendicular to a magnetic field. The magnitude of the electromagnetic force is proportional to the speed of the conductor. As for a pump, the performance of the pump is generally determined by a discharge force and the amount of fluid discharged per time. It is preferable that both the discharge force and the discharge amount per time be high. In the case of the pump according to the invention, as described below, the inside of a vortex chamber 2 having a so-called spiral flow channel is in an external magnetic field region. Accordingly, a magnetic field in a non-ferrous metal melt M is not changed. Accordingly, even though the non-ferrous metal melt is moved at a high speed, eddy current is not generated in the non-ferrous metal melt M. Meanwhile, a magnetic field direction corresponds to the flow-in direction of the non-ferrous metal melt M at an inlet 5. Accordingly, even though the non-ferrous metal melt M flows into a magnetic field region, eddy current is not generated.

The non-ferrous metal melt M, which rotates at a high speed in the vortex chamber 6, is continuously moved outward by a centrifugal force and is turned to an outlet 7 along the outer wall of the vortex chamber 6. Meanwhile, negative pressure is generated at a central portion of the vortex chamber 6 due to the rotation of the non-ferrous metal melt M. Accordingly, the melt M is continuously and efficiently fed.

Figure 2:
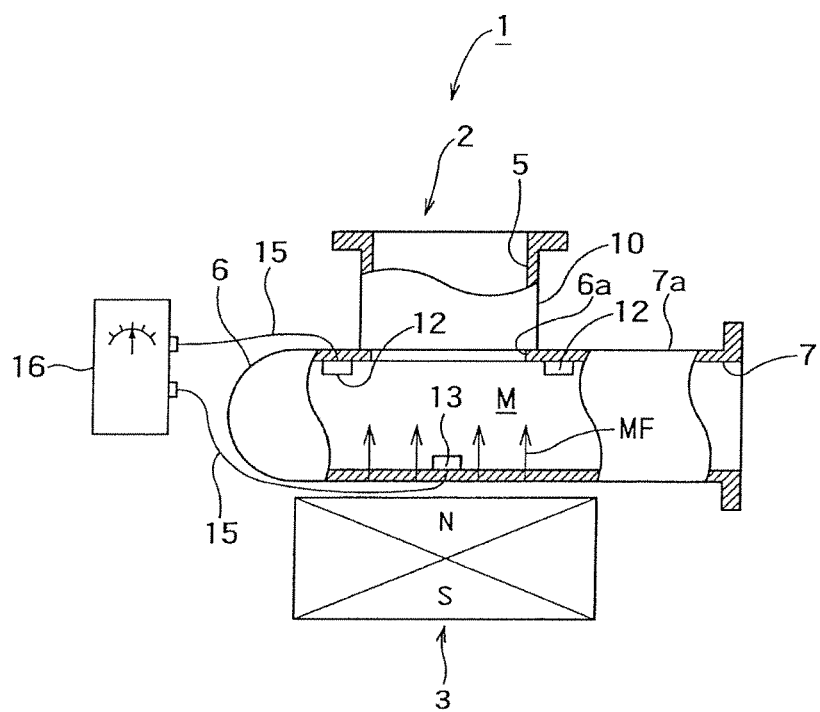
FIG. 2 is a front view of FIG. 1.
Figure 5:
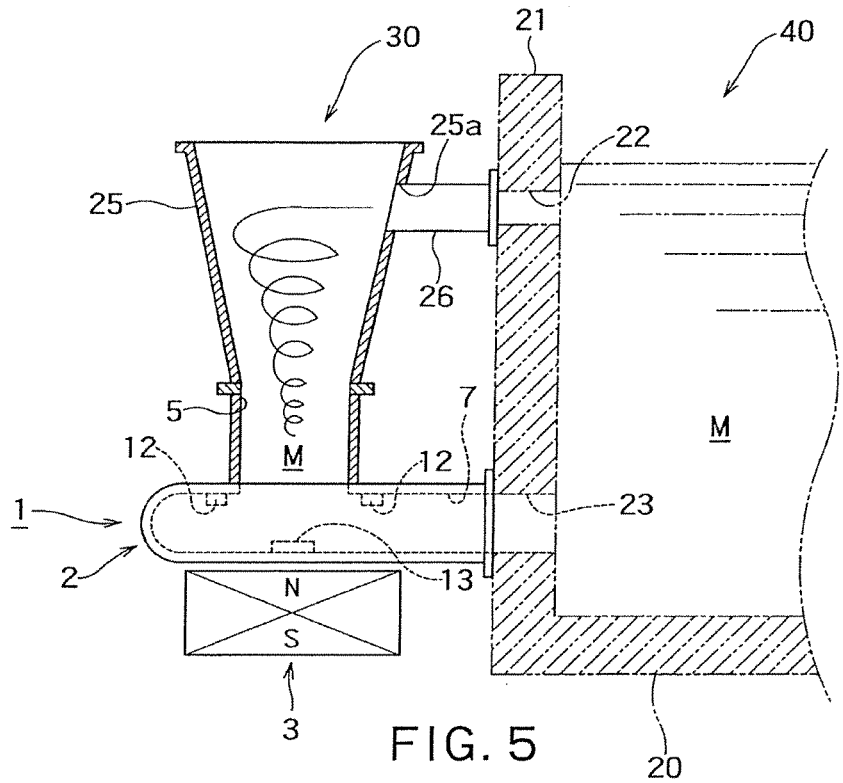
FIG. 5 is a view of main parts of a melting furnace in which the non-ferrous metal melt pump of FIG. 2 is assembled.

In addition, the inlet 5 is connected to and communicates with a hopper-shaped melting furnace 25 as shown in FIG. 5 so that the inlet 5 of the non-ferrous metal melt pump 1 according to the embodiment of the invention faces the upper side as shown in FIG. 2. Accordingly, non-ferrous metal flows into the pump from the melting furnace 25 through the inlet 5, and is discharged at a high speed as a non-ferrous metal melt M from the outlet 7 that is provided at a lower portion of the pump. For this reason, the non-ferrous metal melt M violently generates a vortex in the melting furnace 25. Therefore, if non-ferrous metal is input in a state where a non-ferrous metal material is allowed to be input to the melting furnace 25 communicating with the inlet 5, the non-ferrous metal is rapidly drawn into the non-ferrous metal melt M and rapidly melted.

The embodiment of the invention will be described in detail below.

Figure 1:
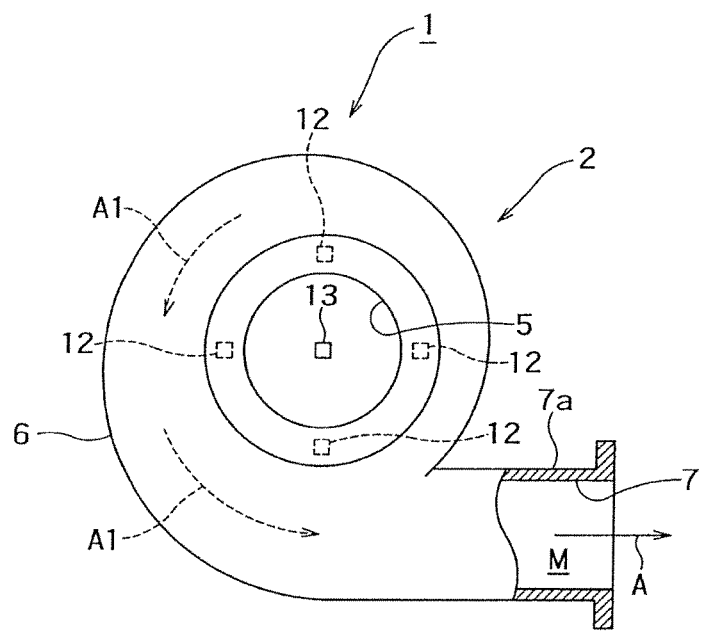
FIG. 1 is a plan view of a so-called non-ferrous metal melt pump without an impeller according to an embodiment of the invention.

FIG. 1 is a plan view of a so-called non-ferrous metal melt pump without an impeller according to an embodiment of the invention. FIG. 2 is a front view of FIG. 1.

As shown in FIGS. 1 and 2, the non-ferrous metal melt pump 1 includes a hollow vortex chamber body 2 and a permanent-magnet type magnetic field device 3 that is disposed outside the vortex chamber body.

The vortex chamber body 2 is made of a fire-resistant material, for example, silicon nitride. The vortex chamber body includes an inlet 5, a vortex chamber 6, and an outlet 7. As described below, a non-ferrous metal melt enters from the inlet 5, is rotationally driven in the vortex chamber 6, reaches the outlet 7, and is discharged to the outside from the outlet 7. The vortex chamber 6 includes a so-called spiral flow channel, and the spiral flow channel is formed from the inlet 5 toward the outlet 7. Further, the vortex chamber 6 is formed so that a cross-sectional area of the flow channel is increased toward the outlet 7. A tubular body 10 is mounted so that a lower opening of the tubular body communicates with an opening 6a formed at the upper surface (top plate) of the vortex chamber corresponding to the inlet 5 as a so-called center of a vortex of the vortex chamber 6. The upper end (upper opening) of the tubular body 10 forms the inlet 5. Further, a part of the side wall of the vortex chamber 6 extends toward the right side in FIG. 1 and forms an outlet portion 7a. The end of the outlet portion 7a forms the outlet 7.

As shown in FIG. 1, the tubular body 10 is mounted on the vortex chamber 6 at an eccentric position in plan view. Further, the outlet portion 7a is formed so that the diameter of a tip of the outlet portion becomes larger than that of a base end of the outlet portion. Accordingly, as seen from the non-ferrous metal melt M that enters the inlet 5, the vortex chamber 6 and the outlet portion 7a are formed to have eccentric structure where the sectional area of the flow channel through which the non-ferrous metal melt M flows is increased from the inlet 5 toward the outlet 7. That is, the vortex chamber 6 has the shape of an arc, which swells to the outside, in a longitudinal section.

As shown in FIG. 2, a plurality of upper electrodes 12, 12, . . . is mounted on the inner surface of the top plate of the vortex chamber 6 while being partially embedded in the top plate. As shown in FIG. 1, these upper electrodes 12, 12, . . . are disposed in the shape of a so-called ring or an arbitrary frame at positions that form a circle along the periphery having a diameter slightly larger than the diameter of the tubular body 10.

Further, as shown in FIG. 2, a lower electrode 13 is mounted on the inner surface of a bottom plate of the vortex chamber 6 while being partially embedded in the bottom plate.

Meanwhile, as long as being positioned so as to face the lower electrode 13 in an up-and-down direction, the upper electrodes 12, 12, . . . do not need to be necessarily disposed in the shape of a ring and may not be positioned near the outer periphery of the inlet 5 in FIG. 1.

These upper electrodes 12, 12, . . . and the lower electrode 13 are connected to a DC power supply 16 by cables 15 and 15. Accordingly, current I flows between positive and negative terminals of the DC power supply 16 through the cable 15, the upper electrodes 12, 12, . . . , the non-ferrous metal melt M, the lower electrode 13, and the cable 15. Further, the current may flow in reverse order. Paths for current I flowing in the non-ferrous metal melt M will be described below.

It is preferable that the DC power supply 16 be an output current variable device. Alternatively, the DC power supply may separately have a function of an amperemeter, a function of a voltmeter, and other functions required for the management of safe operation.

The permanent-magnet type magnetic field device 3, which is disposed below the vortex chamber body 2 in FIG. 2, is formed so as to apply a magnetic field to the non-ferrous metal melt M that exists in the vortex chamber 6. As shown in FIG. 2, the permanent-magnet type magnetic field device 3 is magnetized so that the upper and lower surfaces of the permanent-magnet type magnetic field device form magnetic poles. In FIG. 2, the upper surface forms a north pole and the lower surface forms a south pole. Accordingly, as shown in FIG. 2, magnetic flux MF from the north pole of the permanent-magnet type magnetic field device 3 passes through the non-ferrous metal melt M from the lower side to the upper side.

A heat insulation material is interposed between the permanent-magnet type magnetic field device 3 and the outer wall of the vortex chamber body 2, so that the permanent-magnet type magnetic field device 3 is protected from high temperature. Although not shown, a heat insulation material is also provided around the vortex chamber 6 so as to keep the vortex chamber warm.

The flows of the magnetic flux MF and the current I, which pass through the non-ferrous metal melt M, and a relationship therebetween will be described below.

Figure 3A:
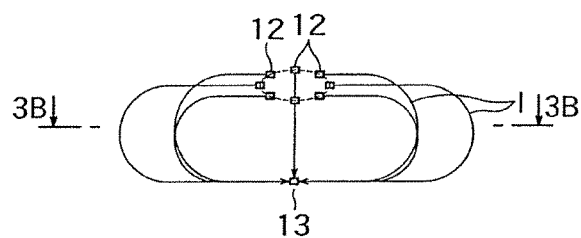
FIG. 3A is a view showing paths for current flow in the non-ferrous metal melt pump of FIG. 1.
Figure 3B:
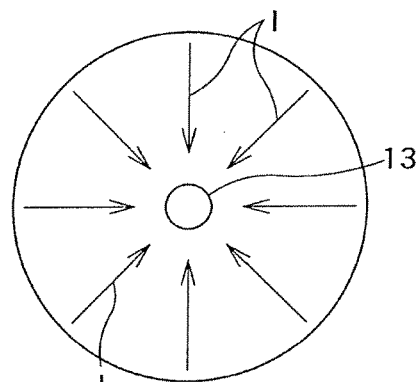
FIG. 3B is a view partially showing the paths for current flow in the non-ferrous metal melt pump of FIG. 1.

FIG. 3A shows the flow of current. According to the acquired knowledge of the inventor, current flows in paths along the inner surface of the vortex chamber 6 between the upper electrodes 12, 12, . . . and the lower electrode 13 through the non-ferrous metal melt M. In section taken along a line 3B-3B of FIG. 3A, current I flows as shown in FIG. 3B. This will be described in detail below.

The upper electrodes 12, 12, . . . do not need to be necessarily disposed in the shape of a ring. If these upper electrodes 12, 12, . . . are disposed on the inner surface of the vortex chamber 6 at desired upper positions in the vortex chamber 6, current I flows in the paths along the inner surface of the vortex chamber 6 between the upper electrodes 12, 12, . . . and the lower electrode 13 at the desired upper positions.

Figure 4:
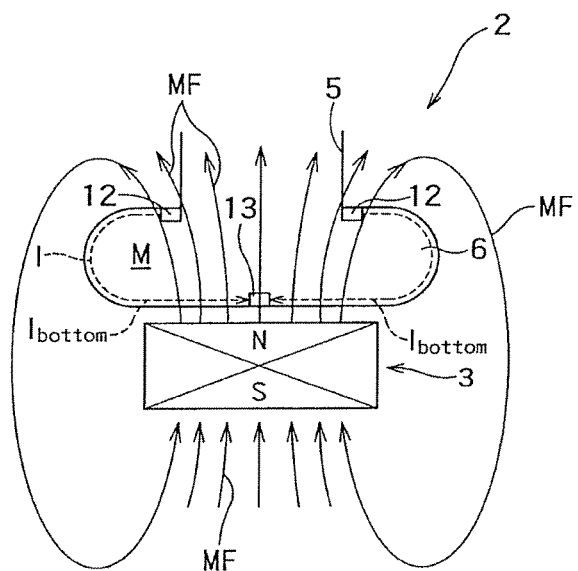
FIG. 4 is a view showing the paths for current flow and paths for magnetic flux in the non-ferrous metal melt pump of FIG. 1.

A relationship between the paths of the current I and the vortex chamber 6 is shown in FIG. 4. Paths of the magnetic flux MF are also shown in FIG. 4.

That is, current I flows from the upper electrodes 12, 12, . . . to the lower electrode 13 along the inner surface of the vortex chamber 6, and the magnetic flux MF reaches the lower south pole from the upper north pole so as to pass through the non-ferrous metal melt M from the lower side to the upper side.

The direction of the flow of the current I and the direction of the magnetic flux MF are shown in FIG. 4.

In more detail, in FIG. 4, the magnetic flux MF flows in the up-and-down direction. Meanwhile, current $I_{bottom}$ of the current I, which flows to the lower electrode 13 along the bottom surface of the vortex chamber 6, flows transversely. That is, the magnetic flux MF and the current $I_{bottom}$ are perpendicular to each other, so that an electromagnetic force is applied to the non-ferrous metal melt M and the non-ferrous metal melt M is rotationally driven.

In contrast, the inventor has mentioned that current I flows in the paths shown in FIG. 4 "according to the acquired knowledge of the inventor". The reason why knowledge is acquired if current flows as described above is as follows: the inventor has confirmed the structure of FIG. 4, that is, has confirmed in the experiment that the non-ferrous metal melt M is actually rotated when the magnetic flux MF flows as shown in FIG. 4 and the upper electrodes 12, 12, . . . and the lower electrode 13 are disposed as shown in FIG. 4. Considering the rotation, there is no choice but to understand that current I, particularly, current $I_{bottom}$ flows as shown in FIG. 4. It may be considered that this is caused by a principal similar to a so-called skin effect.

In FIG. 1, due to the flows of the magnetic flux MF and the current I, the non-ferrous metal melt M existing in the vortex chamber 6 flows in a direction of an arrow A and is discharged from the outlet 7.

In more detail, if the non-ferrous metal melt M enters the vortex chamber 6 from the inlet 5 now, the non-ferrous metal melt M is rotated at a high speed along the arrow A1 shown in FIG. 1. Accordingly, the non-ferrous metal melt M is pushed toward the outer periphery by a centrifugal force, and flows toward the outlet 7. As a result, the electrodes 12, 12, . . . of the permanent-magnet type magnetic field device 3 correspond to negative pressure. For this reason, the non-ferrous metal melt M is more strongly drawn into the vortex chamber 6 from the inlet 5. As a result, the non-ferrous metal melt M continues to be forcibly fed.

In this case, the amount of the non-ferrous metal melt M fed per unit time may be adjusted by the intensity of the output current of the DC power supply 4.

FIG. 5 shows a non-ferrous metal melting furnace 30 that is formed by mounting a hopper-shaped melting furnace 25 on the non-ferrous metal melt pump 1, and a melting furnace system 40 that is formed by mounting the non-ferrous metal melting furnace 30 on a holding furnace 20 for the non-ferrous metal melt.

That is, the non-ferrous metal melting furnace 30 is formed by mounting the hopper-shaped melting furnace 25 on the inlet 5 of the non-ferrous metal melt pump 1.

Figure 6:
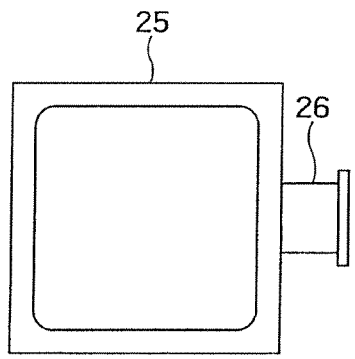
FIG. 6 is a plan view of an example of an opening of the non-ferrous metal melting furnace shown in FIG. 5.
Figure 7:
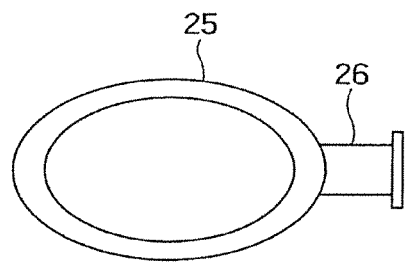
FIG. 7 is a plan view of another example of the opening of the non-ferrous metal melting furnace shown in FIG. 5.

An opening 25a, which is formed at the side surface of the melting furnace 25, communicates with a discharge port 22, which is opened at a side wall 21 of the holding furnace 20, by a pipe 26. The melting furnace 25 is used for the input of a raw material of non-ferrous metal of an object to be melted. The opening of the melting furnace 25 may have a circular shape, an oval shape, or a rectangular shape in plan view. Examples of the shape of the opening are shown in FIGS. 6 and 7. That is, the inventor has made various melting experiments. From the results of the melting experiments, the opening, which is formed at the upper portion of the melting furnace 25, has been formed in a rectangular shape and an oval shape in plan view as shown in FIGS. 6 and 7. It has been confirmed that the melting furnace 25 including openings having these shapes efficiently perform melting.

In addition, the outlet 7 of the non-ferrous metal melt pump 1 communicates with an inflow port 23 that is formed at the side wall 21 of the holding furnace 20.

In FIG. 5, the non-ferrous metal melt M existing in the holding furnace 20 flows into the non-ferrous metal melt pump 1 from the melting furnace 25. The flown non-ferrous metal melt M is continuously pushed from the outlet 7 into the holding furnace 20 by the above-mentioned operation of the non-ferrous metal melt pump 1. In this case, the non-ferrous metal melt M is sucked by the non-ferrous metal melt pump 1 while being violently caught in a vortex in the melting furnace 25 as shown in FIG. 5.

In the end, the amount of the circulated non-ferrous metal melt M corresponds to the amount of the non-ferrous metal melt that is discharged by the non-ferrous metal melt pump 1 connected to the lower portion of the melting furnace 25.

That is, if non-ferrous metal as a raw material is input to the melting furnace 25 from the upper side, the non-ferrous metal may be rapidly melted. As the intensity of the force, which draws the raw material, of a vortex is increased, a melting rate is increased. For this reason, the shape of a vortex in the melting furnace 25 is important. The shape of a vortex is determined by the shape of the melting furnace 25.

In the above-mentioned embodiment, the melt M existing in the vortex chamber 6 has been rotated by an electromagnetic force that is generated by the so-called stationary permanent magnet 3 and the current I flowing between and the upper electrodes 12, 12, . . . and the lower electrode 13. However, the melt M may be rotated by rotating a plurality of permanent magnets instead of this.

Figure 8A:
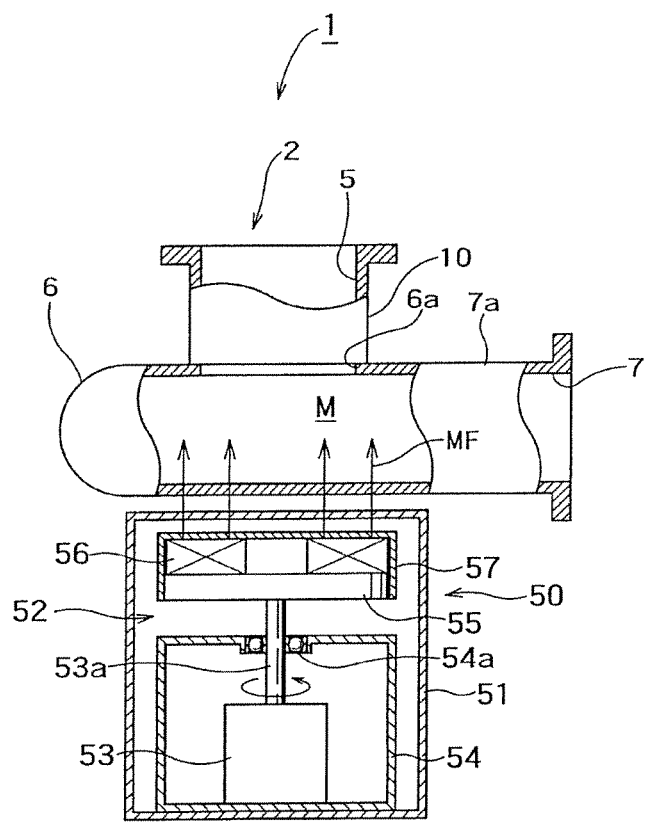
FIG. 8A is a front sectional view of a part of another embodiment of a movable magnetic field generator using permanent magnets.
Figure 8B:
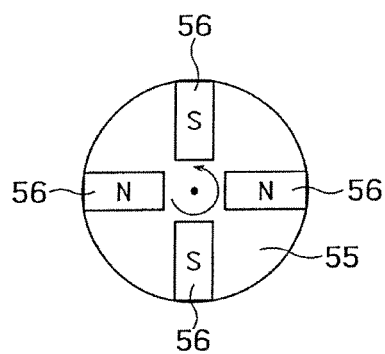
FIG. 8B is a plan view showing the disposition of the permanent magnets shown in FIG. 8A.

This embodiment is shown in FIGS. 8A and 8B. FIG. 8A is a front sectional view of a part of the movable magnetic field generator of this embodiment, and FIG. 8B is a plan view of main parts of a rotating magnet body in FIG. 8A.

FIG. 8A is different from FIG. 2 in that electrodes 12 and 13 are not provided in the vortex chamber 6, there is not provided the DC power supply 16 for supplying power to the electrodes 12 and 13, and a movable magnetic field generator 50 is provided below the vortex chamber 6.

The movable magnetic field generator 50 may have various kinds of structure. For example, the movable magnetic field generator may have structure where a rotating magnet body 52 is provided in a nonmagnetic casing 51 as shown in FIG. 8A. In the rotating magnet body 52, a motor 53 is provided in a case 54, a shaft 53a of the motor 53 is supported by a bearing 54a, and a disk-shaped magnet base 55 is rotated by the motor 53. A plurality of permanent magnets 56, 56, . . . is fixed to the magnet base 55 at an interval of 90°. These permanent magnets 56, 56, . . . are magnetized so that the upper and lower surfaces of the permanent magnets form magnetic poles and adjacent permanent magnets 56, 56, . . . have different polarities as shown in FIG. 8B. These permanent magnets 56, 56, . . . are covered with a nonmagnetic cover 57.

Due to the above-mentioned structure, magnetic flux (magnetic lines of force) MF from the permanent magnets 56, 56, . . . passes through the melt M existing in the vortex chamber 6 as shown in FIG. 8A, or the magnetic flux MF having passed through the melt M enters the permanent magnets 56, 56, . . . . If the permanent magnets 56, 56, . . . are rotated in this state, the magnetic flux MF also moves in the melt M, so that the melt M is also rotated by an electromagnetic force.

In more detail, the plurality of permanent magnets 56, 56, . . . generates magnetic lines of force that pass through the non-ferrous metal melt M existing in the vortex chamber 6 substantially in the first direction (up-and-down direction). The flow-in direction of the non-ferrous metal melt M that flows into the vortex chamber 6, and the direction of the magnetic lines of force that are generated by the movable magnetic field generator 50 follow the first direction. As the permanent magnets 56, 56, . . . are rotated, the magnetic lines of force move the non-ferrous metal melt while passing through the non-ferrous metal melt M substantially in the first direction. Accordingly, the driving force is applied to the non-ferrous metal melt M.

Figure 9:
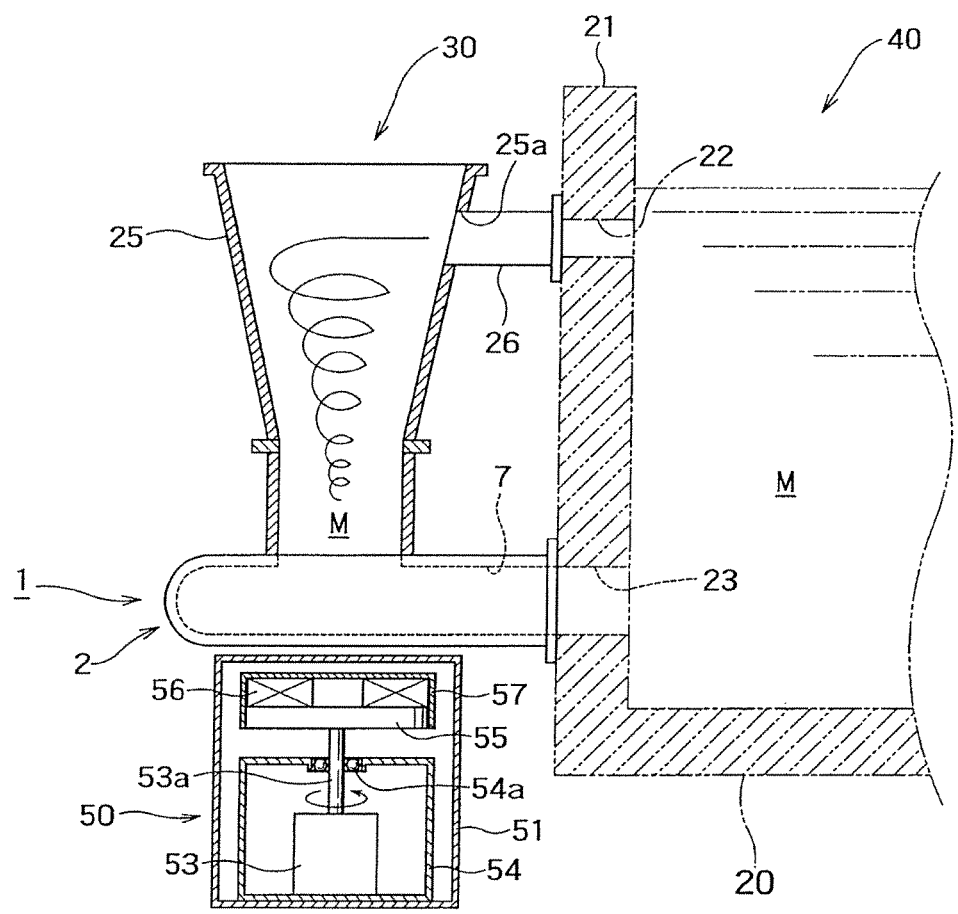
FIG. 9 is a view of main parts of a melting furnace system in which the movable magnetic field generator and the non-ferrous metal melt pump of FIG. 8A are assembled.

FIG. 9 shows a modification of the melting furnace of FIG. 5, and a melting furnace system 40 in which the movable magnetic field generator 50 and the non-ferrous metal melt pump 1 of FIG. 8A are applied to a holding furnace 20. The system 40 is also operated in the same manner as the melting furnace of FIG. 5.

In FIGS. 8A, 8B, and 9, the equivalent members as the members of the embodiment of the other drawings are denoted by the same reference numerals, and the detailed description thereof will not be repeated.

Figure 10:
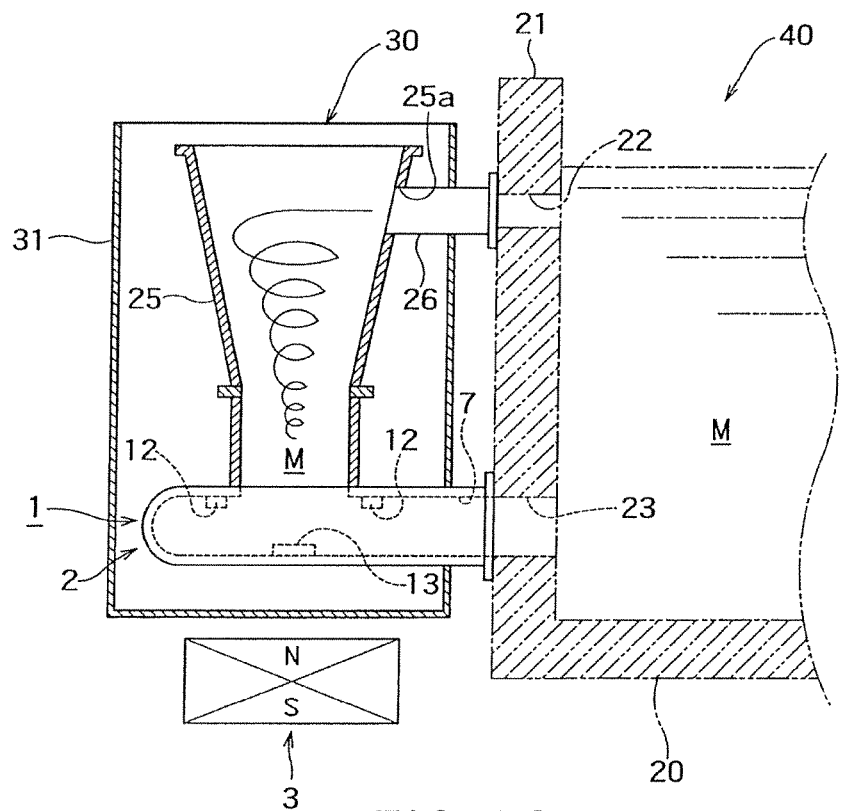
FIG. 10 is a view of main parts of a melting furnace that shows a modification of FIG. 5.
Figure 11:
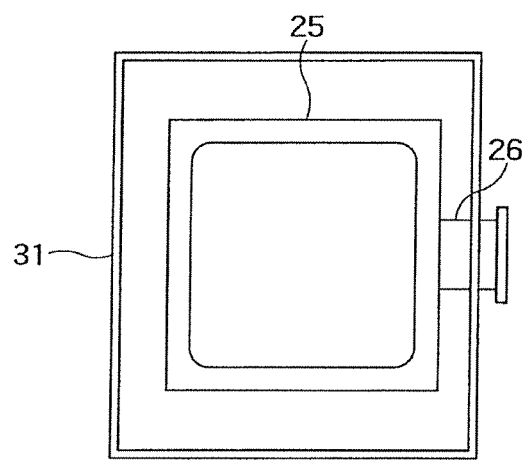
FIG. 11 is a plan view of FIG. 10.
Figure 12:
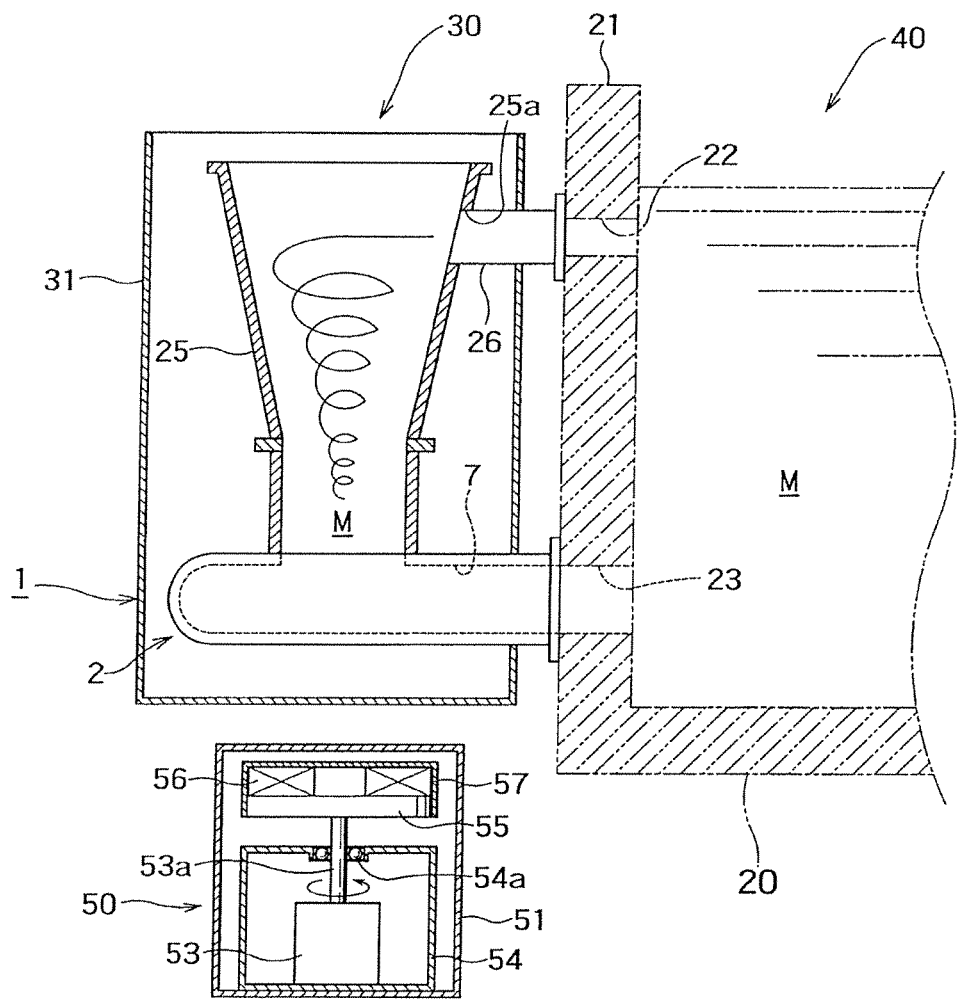
FIG. 12 is a view of main parts of a melting furnace that shows a modification of FIG. 9.

Meanwhile, FIGS. 10, 11, and 12 show a modification of the embodiment that is shown in FIGS. 5, 6, and 9.

That is, as shown in FIGS. 10, 11, and 12, the melting furnace system 40 further includes an aluminum melt receiving box 31. If the aluminum melt leaks from the hopper-shaped melting furnace 25 and the non-ferrous metal melt pump 1, the aluminum melt receiving box 31 receives the aluminum melt so that the aluminum melt does not leak to the outside. The aluminum melt receiving box 31 is made of refractories that are resistant to the aluminum melt.

The melting furnace system 40 of FIG. 12 also includes the same aluminum melt receiving box 31 as described above.

As described above, according to the embodiment of the invention, it may be possible to provide a non-ferrous metal melt pump that has simple structure, is easily handled, is inexpensive, and is free from running costs or maintenance, and a non-ferrous metal melting furnace using the non-ferrous metal melting furnace.

The results of experiments, which have been made to confirm the advantage of the invention by the inventor, will be described below.

That is, when power of 1 to 2.2 Kw was applied between the upper electrodes 12, 12, . . . and the lower electrode 13 in the embodiment shown in FIG. 5, carrying amount 6.75 to 40.5 T/H was obtained, and 10 to 50 m/min of the speed of the flow of the non-ferrous metal melt M were obtained. Further, 100 to 500 Kg/H of the amount of the sucked raw material was obtained. Of course, it goes without saying that it may be possible to obtain higher values if the amount of supplied power is increased.

In addition, the followings were understood.

That is, in general, when an aluminum melt is moved in an alternate magnetic field, the aluminum melt causes vibration. There has been already known that the crystal structure of the aluminum melt is to become fine and uniform by the vibration. There also has been proposed an electromagnetic agitator using this.

In contrast, according to the embodiment, which is shown in FIGS. 9 and 12, of the embodiments of the invention, in a process for melting aluminum chips, a magnetic field (strictly, an alternate magnetic field) of a permanent magnet is used as an energy source that generates a strong flow in a aluminum melt. Accordingly, it was possible to observe that the appropriate aluminum crystal structure efficiently becomes fine and uniform and the reduction of the hydrogen concentration (degassing) is efficiently performed in the aluminum melt, by an electron microscope or other measuring devices. As a result, it was possible to improve the mechanical strength, quality, and yield of die cast products that are obtained from the aluminum melt. Further, it was possible to know that the energy was saved by the improvement of the efficiency of agitation of a melt in the manufacturing process.

What is claimed is:

1. A non-ferrous metal melting furnace comprising:
    a substantially tubular melting furnace including an opening through which non-ferrous metal as a raw material is input;
    a non-ferrous metal melt pump, comprising a vortex chamber body that makes a non-ferrous metal melt flow into a vortex chamber from an inlet, and that discharges the non-ferrous metal melt from the vortex chamber to an outlet by applying a driving force to the non-ferrous metal melt in the vortex chamber;
    a magnetic field device formed of permanent magnets that is disposed outside the vortex chamber and below a bottom plate of the vortex chamber, to apply the driving force to the non-ferrous metal melt,
    wherein, in the vortex chamber body,
        the inlet and the bottom plate face each other along an up-and-down direction,
        the outlet is opened in a horizontal direction that is substantially perpendicular to the up-and-down direction,
        the bottom plate forms a flat surface extending along the horizontal direction,
        a first electrode is disposed substantially at a center of an inner surface of the bottom plate,
        a plurality of second electrodes are disposed on the inner surface of a top plate of the vortex chamber, whereby a current flowing between the plurality of second electrodes and the first electrode, flows along the inner surface of the upper plate of the vortex chamber facing the inner surface of the bottom plate in the up-and-down direction, and
        wherein the second electrodes are radially positioned around an axis line so that each current flows between each of the plurality of second electrodes and the first electrode, the axis line extending along the up-and-down direction and passing through the first electrode,
        the magnetic field device formed of permanent magnets is disposed outside the bottom plate of the vortex chamber of the vortex chamber body so that the magnetic field device faces the bottom plate, and
        the flow-in direction of the non-ferrous metal melt that flows into the vortex chamber, and the direction of the magnetic lines of force that are generated by the magnetic field device formed of permanent magnets both follow the up-and-down direction,
    wherein the non-ferrous metal melt pump is disposed so that the inlet faces the upper side, and
    a bottom opening of the melting furnace communicates with the inlet.

2. The non-ferrous metal melting furnace according to claim 1, wherein the opening has a circular planar shape, an oval planar shape, or a rectangular planar shape.

3. The non-ferrous metal melting furnace according to claim 2, further comprising:
    a holding furnace that holds a non-ferrous metal melt, wherein an upper portion of a side wall of the melting furnace communicates with a non-ferrous metal melt discharge port of the holding furnace, and
    the outlet of the vortex chamber communicates with a non-ferrous metal melt inflow port of the holding furnace.

4. The non-ferrous metal melting furnace according to claim 1, further comprising:
    a melt receiving box that receives non-ferrous metal that flows from either the non-ferrous metal melt pump or the melting furnace.

5. A non-ferrous metal melting furnace comprising:
    a substantially tubular melting furnace including an opening through which non-ferrous metal as a raw material is input;
    a non-ferrous metal melt pump, comprising a vortex chamber body that makes a non-ferrous metal melt flow into a vortex chamber from an inlet and that discharges the non-ferrous metal melt from the vortex chamber to an outlet by applying a driving force to the non-ferrous metal melt in the vortex chamber;
    a movable magnetic field generator that is disposed outside the vortex chamber and below a bottom plate of the vortex chamber to apply the driving force to the non-ferrous metal melt,
    wherein, in the vortex chamber body, the inlet and the bottom plate face each other along an up-and-down direction, and the outlet is opened in a horizontal direction,
    wherein the movable magnetic field generator comprises rotatable permanent magnets that generate magnetic lines of force, the magnetic lines of force passing through the non-ferrous metal melt in the vortex chamber substantially in the up-and-down direction, the flow-in direction of the non-ferrous metal melt that flows into the vortex chamber and the direction of the magnetic lines of force that are generated by the movable magnetic field generator both follow along the up-and-down direction, wherein when the permanent magnets rotate, the magnetic lines of force move such that the magnetic lines of force pass through the non-ferrous metal melt substantially in the up-and-down direction, so that the driving force is applied to the non-ferrous metal melt,
    wherein the movable magnetic field generator further comprises:
    a magnet base which is a rotating plate that is supported by a bearing so that the magnet base can rotate around an axis line, the axis line extending in the up-and-down direction and passing through the bearing; and
    the permanent magnets are disposed on the surface of the magnet base, each of the permanent magnets being magnetized to form magnetic poles at both ends, the long direction of the permanent magnets being along the up-and-down direction, the permanent magnets being disposed at predetermined intervals from one another on the surface of the magnet base along the circumference of the axis line, the permanent magnets being adjacent to one another along the circumferential direction, and the poles of the adjacent permanent magnets facing the bottom plate of the vortex chamber being disposed so that different polarities are arranged alternately, wherein the non-ferrous metal melt pump is disposed so that the inlet faces the upper side, and a bottom opening of the melting furnace communicates with the inlet.

6. The non-ferrous metal melting furnace according to claim 5, further comprising:

a holding furnace that holds a non-ferrous metal melt, wherein an upper portion of a side wall of the melting furnace communicates with a non-ferrous metal melt discharge port of the holding furnace, and the outlet of the vortex chamber communicates with a non-ferrous metal melt inflow port of the holding furnace.

7. The non-ferrous metal melting furnace according to claim 5, further comprising:

a melt receiving box that receives non-ferrous metal that flows from either the non-ferrous metal melt pump or the melting furnace.

* * * * *